United States Patent [19]

Sakai

[11] Patent Number: 4,466,502

[45] Date of Patent: Aug. 21, 1984

[54] SYSTEM FOR CONTROLLING TRANSMISSION TORQUE OF A FOUR-WHEEL DRIVE VEHICLE

[75] Inventor: Yasuhito Sakai, Musashino, Japan

[73] Assignee: Fuji Jukogyo Kabushiki Kaisha, Tokyo, Japan

[21] Appl. No.: 424,654

[22] Filed: Sep. 27, 1982

[30] Foreign Application Priority Data

Sep. 29, 1981 [JP] Japan ............................ 56-155854

[51] Int. Cl.³ ............................................ B60K 17/34
[52] U.S. Cl. ................................... 180/247; 180/248
[58] Field of Search ............... 180/233, 247, 248, 249, 180/250, 197

[56] References Cited

U.S. PATENT DOCUMENTS 4,417,641 11/1983 Kageyama ..................... 180/233

FOREIGN PATENT DOCUMENTS 56-138019 10/1981 Japan ............................ 180/233

Primary Examiner—Joseph F. Peters, Jr.
Assistant Examiner—D. Lynn Fugate
Attorney, Agent, or Firm—Martin A. Farber

[57] ABSTRACT

A system for a four-wheel drive vehicle for automatically changing transmission torque to rear wheels. The system is provided with a fluid pressure controlled friction clutch which is in a partial engagement state in an ordinary driving condition for transmitting the power of the engine to rear wheels. Therefore, when the vehicle turns a corner, the friction clutch slips to allow the rear wheels to rotate slower than front wheels. A load sensor and slip detecting device are provided for producing signals. A control system is provided to respond to the signals for increasing the engagement part of the friction clutch to provide a sufficient four-wheel driving.

4 Claims, 3 Drawing Figures

SYSTEM FOR CONTROLLING TRANSMISSION TORQUE OF A FOUR-WHEEL DRIVE VEHICLE

BACKGROUND OF THE INVENTION

The present invention relates to a system for a four-wheel drive vehicle for automatically controlling transmission torque to rear-wheel.

During the driving of the four-wheel drive vehicle, an amount of tire scraping occurs because of slight differences in effective wheel radii caused by inevitable differences in tire inflation, tread wear or variation in loading. In addition, when the vehicle negotiates corners, braking phenomenon called "tight corner braking" will occur at a sharp corner. This is caused by the reason that the front wheels run through an arc of greater radius than that of the rear wheels and therefore tend to rotate faster than the rear wheels. This will result in increase of tire wear and fuel consumption and decrease of driveability.

In order to eliminate such disadvantages, a four-wheel drive vehicle provided with a friction clutch system having a variable transmission torque has been proposed. Generally, the transmission torque is controlled in dependency on the steering angle, causing the slip in the friction clutch to prevent the tight corner braking.

SUMMARY OF THE INVENTION

The object of the present invention is to provide a system for controlling a transmission torque to the rear-wheel which is provided with a fluid pressure controlled friction clutch such that the transmission torque can be controlled in dependency on not only steering angle, but also other driving conditions such as the slipping of wheels.

According to the present invention, there is provided a system for controlling a transmission torque of a four-wheel drive vehicle powered by an engine, which comprises a transmission for transmitting a power of the engine to front wheels; a friction clutch for transmitting the power to rear wheels; clutch operating means for engaging and disengaging the friction clutch, the clutch operating means comprising a friction means for providing a partial engagement of the clutch, a second means for providing an engagement greater than the partial engagement, and a third means for disengaging the clutch; slip detecting means for detecting the slipping of wheels; load detecting means for detecting the load on the engine; control means responsive to signals from the slip detecting means and load detecting means for operating the second means so as to engage the clutch at heavy load and at the slipping of wheels.

The present invention will be more apparent from the following description made with reference to the accompanying drawings.

DETAILED DESCRIPTION OF THE PREFERRED EMBODIMENTS

Figure 1:
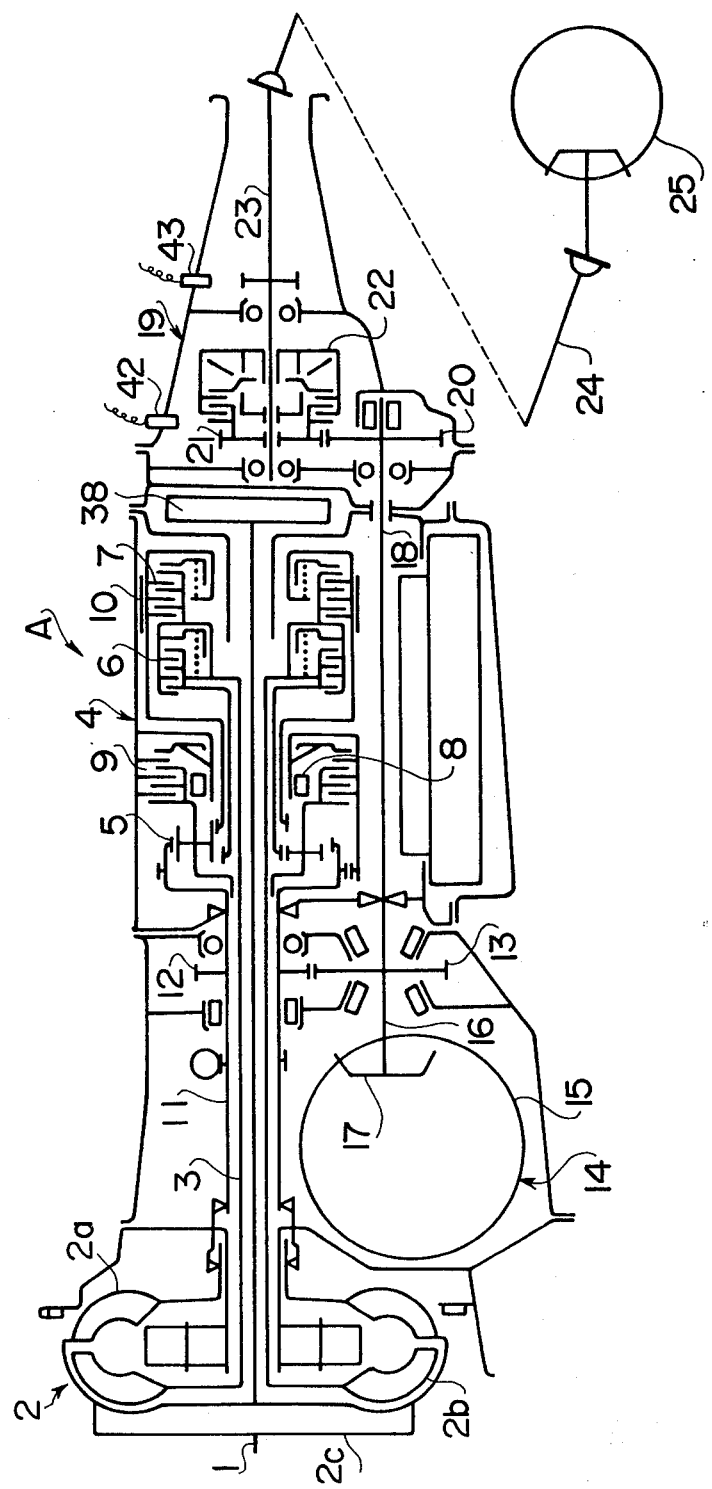
FIG. 1 is a schematic view showing a transmission system used in a system according to the present invention.

Referring to FIG. 1, a system of the present invention has a crankshaft 1 of an internal combustion engine (not shown) mounted on a front portion of a vehicle. The crankshaft 1 of the engine is operatively connected with a torque converter 2 of an automatic transmission A.

The automatic transmission A comprises the torque converter 2, an automatic transmission device 4, and a final reduction device 14 for front wheels.

The torque converter 2 comprises a pump impeller 2a and a turbine 2b. The pump impeller 2a is in direct connection with the engine crankshaft 1 through a drive plate 2c. A turbine shaft 3 is extended from the turbine 2b to the automatic transmission device 4.

The automatic transmission device A comprises a planetary gear 5, clutches 6 and 7 for selectively transmitting the output of the turbine shaft 3 to the planetary gear 5, a one-way clutch 8, a brake 9 and brake band 10 for selectively locking elements of the planetary gear 5.

The output of the automatic transmission device is transmitted to an output shaft 11 on which a drive gear 12 is securely mounted and which in turn engages with a driven gear 13. The driven gear 13 is securely mounted on a shaft 16 which is integral with a drive pinion 17. The drive pinion 17 engages with a crown gear 15 of the final reduction device 14 for the front wheels. The shaft 16 is connected to a transfer drive shaft 18 which extends rearwardly and is connected to a first transfer gear 20 of a transfer device 19. The first transfer gear 20 is engaged with a second transfer gear 21. The second transfer gear 21 is rotatably mounted on a rear drive shaft 23. A fluid pressure controlled friction clutch 22 of the type of multiple-disk is mounted on the rear drive shaft 23 for engaging the gear 21 with the shaft 23. The rear drive shaft 23 is further operatively connected to a final reduction device 25 for rear wheels through a propeller shaft 24.

Figure 2:
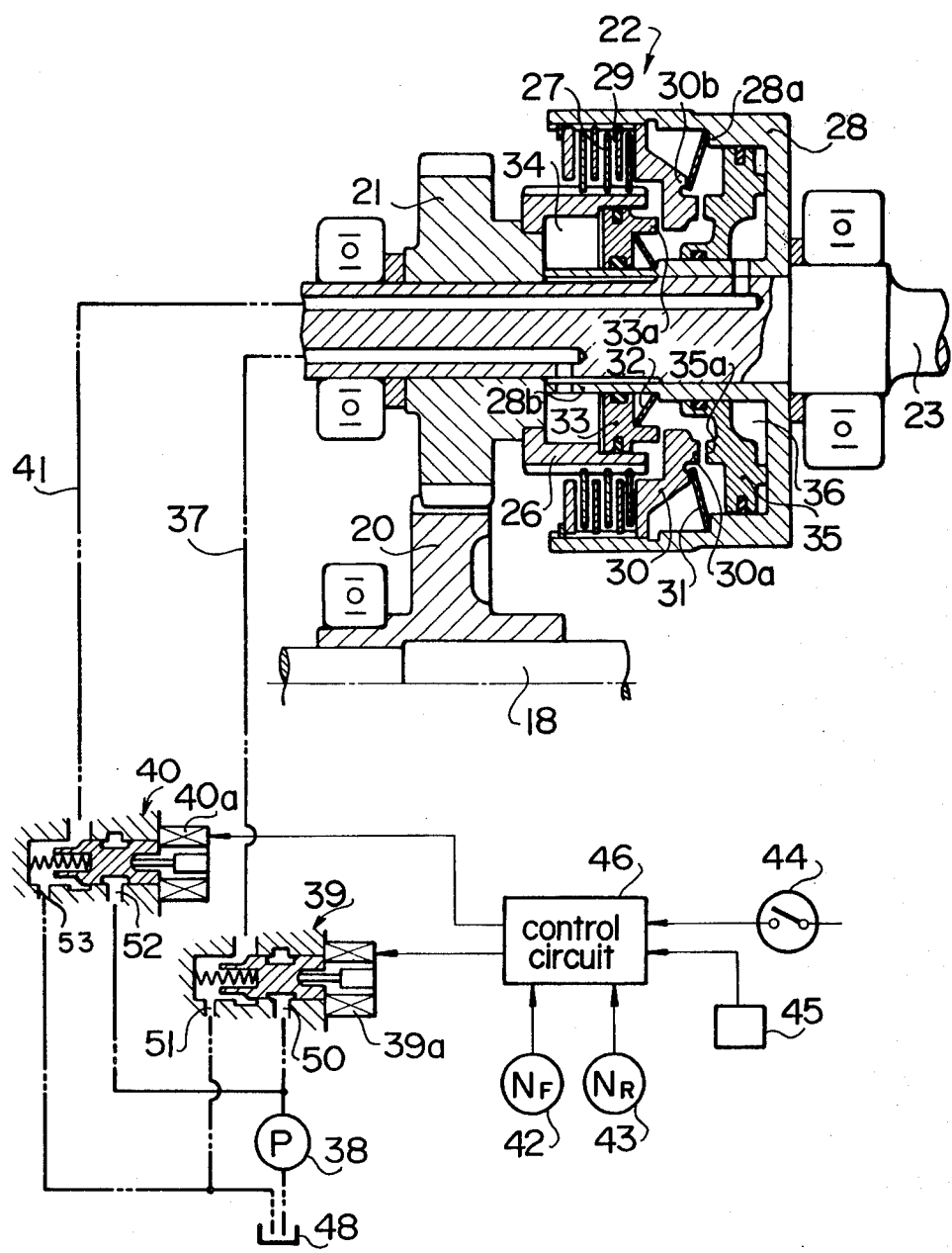
FIG. 2 is a schematic illustration showing an example of the present invention.

Referring to FIG. 2, the fluid pressure controlled friction clutch 22 comprises a cylindrical boss 26 secured to the second transfer gear 21, a cylindrical shell 28 secured to the rear drive shaft 23. A plurality of disks 27 and 29 are alternately arranged and secured to the boss 26 and shell 28 by means of spline engagement, respectively. An annular pressure plate 30 is slidably mounted in the shell 28. The pressure plate 30 has an annular projection 30a and an annular groove 30b. An annular spring plate 31 is disposed between the groove 30b and a shoulder 28a of the shell 28 to urge the pressure plate to disks 27 for establishing a partial engagement state of the clutch. In the boss 26 and shell 28, piston chambers 34 and 36 are formed, and a small diameter piston 33 and a large diameter piston 35 are slidably mounted in the piston chambers 34 and 36, respectively. The small diameter piston 33 has an annular abutment 33a and the large diameter piston 35 has also annular abutment 35a, which are arranged to be engaged with both sides of the pressure plate 30 respectively. An annular return spring plate 32 is disposed between the small diameter piston 33 and the inside cylindrical wall portion 28b of the shell 28 to urge the small diameter piston in the disengaging direction.

The piston chamber 34 is communicated with a solenoid valve 39 by a conduit 37 a part of which is provided in the rear drive shaft 23. The piston chamber 36 is also communicated with a solenoid valve 40 by means of a conduit 41. Inlet ports 50 and 52 are communicated with an oil pump 38 and drain ports 51 and 53 are communicated with a tank 48.

A front wheel speed sensor 42 and a rear wheel speed sensor 43 are provided for detecting respective speeds for applying signals to a control circuit 46 in dependency on the speeds, respectively. An engine load sensor 45, such as a vacuum sensor for detecting vacuum in the induction passage of the engine, is provided for detecting the load on the engine and for applying an output to the control circuit 46 in dependency on the load. Further, a manual switch 44 is electrically connected to the control circuit 46 for operating the solenoid valve 39.

The control circuit is so arranged as to produce output signals to energize a solenoid 39a of the solenoid valve 39 by the closing of the manual switch 44 and to energize both solenoids 39a and 40a by a heavy load signal from the load sensor 45. Further, the control circuit 46 computes signals from the speed sensors 42 and 43 to obtain slip rates of the front and rear wheels and produces an output to energize the solenoid 40a when the slip rate exceeds a predetermined value.

In operation, during a driving condition at a low load under the open state of the switch 44, solenoid 39a and 40a are de-energized, so that oil chambers 34 and 36 are communicated with the tank 48 through the drain ports 51 and 53. Thus, the small diameter piston 33 and large diameter piston 35 do not act on the pressure plate 30. The pressure plate 30 engages with a clutch disk 27 by the spring force of the spring plate 31 thereby to establish a partial engagement of the clutch, where clutch disks 27 and 29 engage at a slight force with each other. Thus, the vehicle is driven by four wheels during an ordinary driving condition. When the vehicle turns a corner, the clutch 22 slips to allow the rear wheels to rotate slower than the front wheels. When the load sensor 45 produces a first heavy load signal at a heavy load, solenoids 39 and 40 are energized to shift respective plungers of both valves 39 and 40 to communicate the pump 38 with conduits 37 and 41, respectively. Thus, pressure oil is applied to oil chambers 34 and 36, so that the pressure plate 30 is pressed against the clutch disk by a force corresponding to the force of the spring plate 31 plus the difference between forces by large diameter piston 35 and small diameter piston 33. Thus, the clutch 22 is engaged with a larger part of the clutch disks than the partial engagement only by the spring plate 31. Therefore, a suitable transmission torque meeting the heavier load is provided for the rear wheels. When the engine load increases further, the load sensor 45 produces a second heavy load signal. The second heavy load signal causes the solenoid 39a to de-energize. Thus, the small diameter piston 33 returns to the retracted position by the spring plate 32 and the pressure plate 30 engages with the clutch disk 27 at a larger force by the spring plate 31 and the large diameter piston 35. Therefore, the clutch engages with the entire part of disks to provide the maximum transmission torque for producing a sufficient four-wheel driving power. Since the transmission torque changes in dependency on the engine load, the vehicle can be driven by proper torque, which will provide a preferable driveability.

When at least either of front or rear wheels slip and the slip rate computed by the control circuit 46 exceeds a predetermined value, the solenoid 40a is energized. Thus, the clutch 22 is wholly engaged to establish a complete four-wheel driving thereby to ensure a stable driving.

When the manual switch 44 is closed, the solenoid 39a is excited to pass the pressure oil to the oil chamber 34. Thus, the small diameter piston 33 is moved to the right to disengage the pressure plate 30 from the clutch disk 27. Accordingly, the clutch 22 is disengaged to provide front-wheel driving. Under the front-wheel driving, when the control circuit 46 produces a slip signal depend on the signals from the speed sensors 42 and 43, solenoid 40a is energized and solenoid 39a is de-energized to establish the four-wheel driving.

Figure 3:
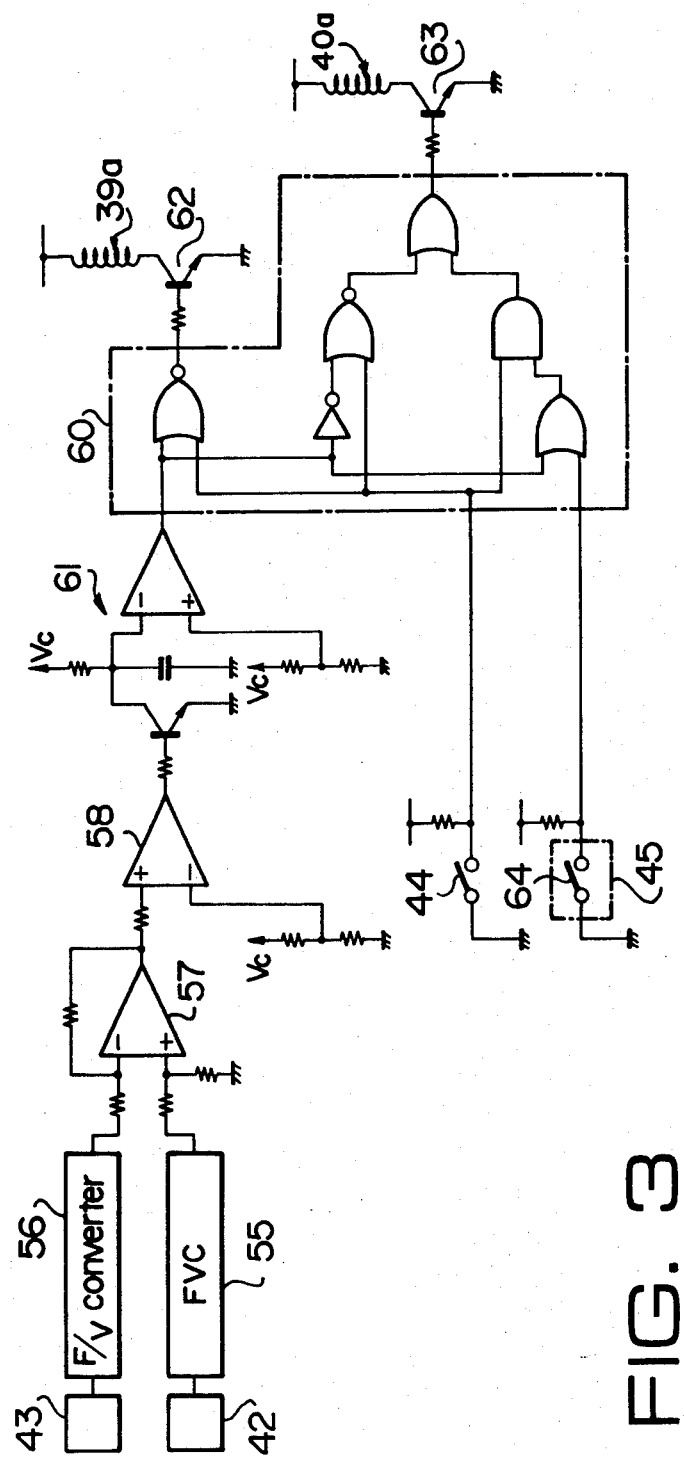
FIG. 3 shows an electric circuit employed in the system of the present invention.

FIG. 3 shows an example of the control circuit 46. The control circuit comprises a pair of frequency-to-voltage converters 55 and 56 electrically connected to the speed sensors 42 and 43 for converting output pulses of the speed sensors to voltages, respectively. Outputs of both converters 42 and 43 are applied to a differential amplifier 57 for detecting the difference between both inputs which means slippage of one of front and rear wheels. The output of the differential amplifier 57 is amplified to a comparator 58 which produces an output when the output of the differential amplifier exceeds a predetermined level, that is a notable slippage occurs. The output of the comparator 58 is applied to a logic circuit 60 through a delay circuit 61. The logic circuit 61 operates in dependency on input signals from the delay circuit 61, manual switch 44 and load sensor 45 to turn on transistors 62 and 63 to energize solenoids 39a and 40a. The load sensor 45 has a switch 64 which is closed when the load is light.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A system for controlling a transmission torque of a four-wheel drive vehicle powered by an engine comprising:
   a transmission for operatively transmitting a power of said engine to front wheels;
   a friction clutch for transmitting said power to rear wheels;
   clutch operating means for engaging and disengaging said friction clutch, said clutch operating means comprising a first means for providing a partial engagement of the clutch, a second means for providing an engagement greater than said partial engagement, and a third means for disengaging said clutch;
   slip detecting means for detecting the slipping of wheels;
   load detecting means for detecting the load on said engine;
   control means responsive to signals from said slip detecting means and load detecting means for operating said second means so as to engage said clutch at heavy load and at the slipping of wheels.

2. The system according to claim 1 further comprising a manual switch for operating said third means.

3. The system according to claim 1 wherein said friction clutch is a fluid pressure controlled friction clutch of the type of multiple-disk.

4. The system according to claim 3 wherein said control means comprises a pressure oil supply circuit including solenoid valves for operating said clutch and an electric circuit for operating the solenoid valves.

* * * * *